United States Patent [19]

Klatt

[11] Patent Number: 4,651,142

[45] Date of Patent: Mar. 17, 1987

[54] APPARATUS TO PROTECT A CLUTCH FROM OVERHEATING

[75] Inventor: Alfred Klatt, Wathlingen, Fed. Rep. of Germany

[73] Assignee: WABCO Westinghouse Fahrzeugbremsen GmbH, Hanover, Fed. Rep. of Germany

[21] Appl. No.: 653,258

[22] Filed: Sep. 24, 1984

[30] Foreign Application Priority Data

Sep. 26, 1983 [DE] Fed. Rep. of Germany ....... 3334725

[51] Int. Cl.$^4$ .................................................. G08B 21/00
[52] U.S. Cl. ................................ 340/679; 192/30 W; 180/278; 340/57
[58] Field of Search .................... 340/679, 57, 52 R; 192/30 W, 3.51; 180/278; 374/102

[56] References Cited

U.S. PATENT DOCUMENTS 4,488,140 12/1984 Lang et al. .................... 340/679 X
4,499,450 2/1985 Makita ............................ 340/52

FOREIGN PATENT DOCUMENTS 2125178 11/1972 Fed. Rep. of Germany ... 192/30 W
2524178 12/1976 Fed. Rep. of Germany ...... 340/679
0140925 8/1982 Japan ............................... 192/30 W
2093618 9/1982 United Kingdom ............. 192/30 W Primary Examiner—James L. Rowland
Assistant Examiner—Jeffery A. Hofsass
Attorney, Agent, or Firm—J. O. Ray, Jr.

[57] ABSTRACT

The invention relates to an apparatus for the protection of a clutch against overheating, specifically a clutch which is located between a combustion motor and a transmission. To ensure protection of the clutch against overheating for most operating conditions, there is an apparatus to determine the drive torque for the determination of the clutch torque or the drive torque transmitted by the clutch, an apparatus for the determination of the slip between the clutch input speed and the clutch output speed, a computer apparatus to determine the product of the clutch or drive torque to be transmitted and the slip, and a monitoring apparatus which combines the value of the product of the clutch torque to be transmitted and the slip with alarm delay times and compares the current slip time with the alarm delay times, and when the alarm delay times are exceeded by the slip times, gives an alarm signal.

22 Claims, 1 Drawing Figure

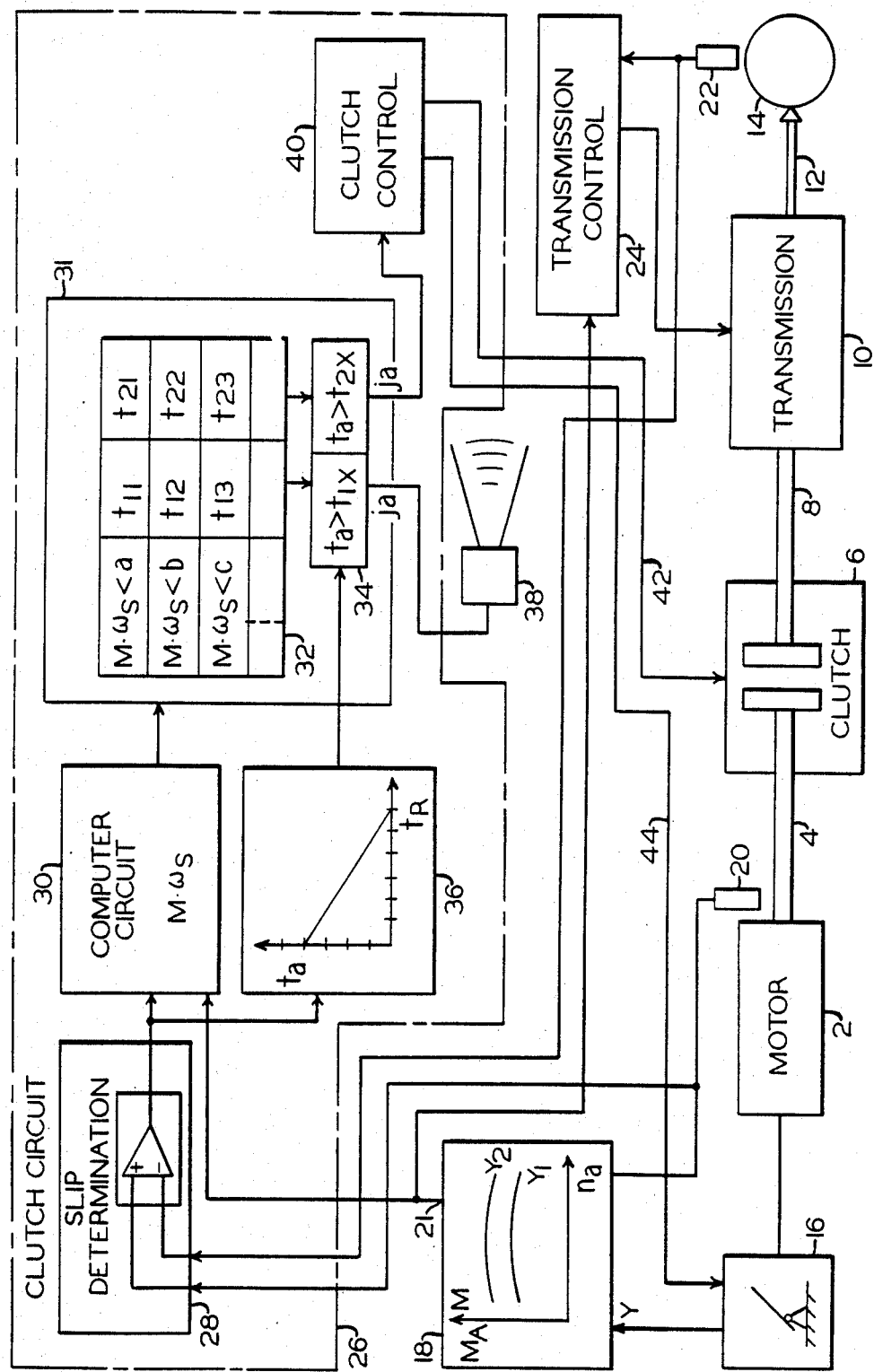

APPARATUS TO PROTECT A CLUTCH FROM OVERHEATING

BACKGROUND OF THE INVENTION

The present invention relates in general to friction clutches and, more particularly, the invention relates to an apparatus which determines when such friction clutch is being operated in a manner which will cause overheating and preventing such manner of operation from continuing beyond a predetermined time.

As is known in the art, friction clutches are used to make an adherence-actuated connection between two moving parts or to separate them. During the normal clutch process, the individual clutch parts can rub against one another for a rather prolonged period of time. This situation occurs particularly on motor vehicle clutches during the start-up and shifting processes when the speeds of the motor and driveshaft must be equalized with one another. As a general rule, motor vehicle clutches are designed so that they can withstand these processes without serious damage. But situations many times occur, particularly in a motor vehicle, in which clutch slip does occur over a relatively long period of time. For example, with a manually-operated clutch, this can occur on a hill when the driver uses the clutch to hold the vehicle on the hill by slipping the clutch and partly depressing the gas pedal. It can also occur when a vehicle equipped with an automatic clutch is kept on a hill for a long period of time with the gas pedal partly depressed. On vehicles equipped with a manually-operated clutch, the driver is generally aware of the danger of "riding" the clutch, and after a short period of time, he will then switch to holding the vehicle on the hill with the brake. On vehicles equipped with automatic clutches, however, he is generally not so aware of the danger of such a condition since he only needs to give the engine a small amount of gas to hold the vehicle on the hill.

One attempt to prevent situations where overheating occurs, it has been proposed in DE-OS No. 3206593 that the rotational slip between the input and output shaft be determined and that a signal be determined from this quantity which, after a predetermined time, is sent to the driver. This apparatus operates very imprecisely, however, because the transmitted moment of friction contributes to the heating of the coupling in an altogether different manner, which is not taken into account in the apparatus described by DE-OS No. 3206593, so that protection against overheating is not ensured under all operating conditions that may be encountered in normal operation of a vehicle.

SUMMARY OF THE INVENTION

The present invention teaches an apparatus to signal a driver of a vehicle that a clutch disposed intermediate such vehicle's engine and transmission is being operated in a manner that will overheat such clutch. The apparatus comprises a means positioned on such vehicle for determining the rotational speed of such vehicle engine and for providing a signal representative of engine rotational speed. A comparator means is connected to receive the signal representative of such engine speed and a signal representative of an amount of fuel being supplied to such engine for determining the drive torque on such engine and for providing a signal representative of said drive torque. A means is positioned on such vehicle for determining the output speed of such clutch and for providing a signal representative of such clutch output speed. A slip determination means is connected to receive the signal representative of the engine rotational speed and the signal representative of the clutch output speed for determining the amount of slip in such clutch and for providing a signal representative of the clutch slip. A calculating means is connected to receive the signal representative of the drive torque and the signal representative of the clutch slip for determining the product of the signals and for providing a signal representative of the product of such signals. A means for providing a signal representative of alarm delay times is also provided. A monitoring means is connected to combine the values of the clutch slip signal and an alarm delay time signal for comparing current slip time with the alarm delay times and for providing an alarm signal when the alarm delay times are exceeded by the current slip time, and an alarm means is connected to receive the alarm signal for alerting the driver of such vehicle that such clutch is in a condition to become overheated.

OBJECTS OF THE INVENTION

It is, therefore, one of the primary objects of the present invention to provide an apparatus that will protect a friction clutch against overheating under most operating conditions such clutch will be subjected to.

Another object of the present invention is to provide an apparatus that will protect a friction clutch installed on a motor vehicle against overheating regardless of whether such vehicle is equipped with a manually-operated transmission or an automatic transmission.

Still another object of the present invention is to provide an apparatus that will protect a friction clutch installed on a motor vehicle against overheating by providing a slow engagement of the clutch and simultaneously a corresponding control of the gas pedal when a specified friction value is exceeded.

These and various other objects and advantages of the present invention will become more apparent to those persons skilled in the friction clutch art from the following more detailed description when such description is taken in conjunction with the attached drawing and the appended claims.

BRIEF DESCRIPTION OF THE DRAWING

The single FIGURE is a schematic representation showing the necessary components to achieve the objectives and advantages of the presently preferred embodiment of the invention.

BRIEF DESCRIPTION OF THE PREFERRED AND ALTERNATIVE EMBODIMENTS OF THE INVENTION

The present invention is based on the fact that for the solution to the problem, the energy that is consumed in the clutch must be determined. This energy can be determined, according to the invention, from the product of the drive torque M and the slip speed. The slip speed can be determined from the difference between the clutch input speed and the clutch output speed. The energy which is consumed by the friction clutch can therefore be calculated by the equation:

$$E = M \cdot (\omega_{Mot} - \omega_G) \cdot t$$

In the equation,

E = the energy which the clutch can accept as friction without experiencing unacceptable damage,
M = the drive torque or moment of torsion,
$\omega_{Mot}$ = is the angular velocity of the motor,
$\omega_G$ = the drive-side angular velocity of the clutch, or the angular velocity of the transmission corrected by the translation ratio, and
t = the slip time.

Although the invention is principally suited for manually or automatically-operated main clutches for road vehicles and will be described as such, it can be used to advantage on all types of friction clutches.

For the determination of the clutch friction, the stationary drive torque which may be required for an automatic transmission can be used to advantage, and this drive torque can be calculated from the weight of the vehicle and the vehicle acceleration at a given motor torque. The determination of the stationary drive torque is described in copending U.S. patent application, Ser. No. 590,247, filed on Mar. 16, 1984, and which description is incorporated herein by reference thereto.

For clutch slip processes which occur in brief succession, it is advantageous to recognize this state of affairs by means of an appropriate apparatus and thereby prevent overheating of the clutch. For this purpose, according to a refinement of the present invention, it is recommended that a memory be used which stores the times of successive clutch slip processes and in which, during times when no clutch slip processes take place, the slip times are reduced according to a specified function which corresponds to the cooling curve of the clutch.

To safely prevent an overheating and to warn the driver not only acoustically or optically, but also to force him to terminate the slip process, a refinement of the invention suggests that there be a steady, slow engagement of the clutch and simultaneously a corresponding control of the gas pedal if a specified friction value is exceeded. The driver will then determine that the vehicle is beginning to move slowly, which will force him to apply the brake and to end the slipping process.

By means of the present invention, clutch damage from overheating is simply and safely prevented since normally very expensive direct measurements of clutch temperatures are no longer necessary. The overheating protection described by the present invention can be accomplished by means of simple impulse transmitters and by means of the drive torque apparatus, which is already present in the automatic transmission. The necessary operations and calculations proposed by the present invention can be carried out advantageously with a currently commercially available microcomputer apparatus.

The "torques" as used in the specification and patent claims also include drive factors of a general nature, such as power factors or comparable values, which contain the drive torques only as one of several operands.

The invention will now be explained below in greater detail with reference to the attached drawing. The drawing shows, in a schematic representation, a motor 2 which is connected by means of a shaft 4 with a friction clutch 6. The friction clutch 6 is connected by means of a shaft 8 with a transmission 10. Transmission 10, by means of a shaft 12, drives wheels 14 of a vehicle. (Only one of these wheels is shown schematically.) The motor 2 is controlled by a transmitter as, for example, a gas pedal 16 to be operated by the driver. The position of the transmitter 16 representative of the amount of fuel being supplied to the motor 2 is also conducted as an information signal y to an apparatus 18 for the determination of the drive torque M. According to the present invention, apparatus 18 includes a memory storage and comparator capability in which the motor 2 characteristics are stored and to which, as another information signal, the speed of the motor 2 is conducted, which is determined by means of a first impulse transmitter 20. The apparatus 18 determines from these signals the corresponding motor 2 drive torque, which is available as an appropriate information signal at a signal output 21.

There is a second impulse transmitter 22 provided for the determination of the speed of rotation of a driven vehicle wheel 14, whose speed signal is conducted to a transmission control apparatus 24, which controls the transmission 10 as a function of the speed of the vehicle wheel 14 and the motor 2 drive torque signal which is also fed to it.

The output signals of the apparatus 18 and the impulse transmitters 20 and 22 are also conducted to a clutch 6 overheating protection circuit 26. The overheating protection circuit 26 has a slip determination apparatus 28 in which, by differentiation between the clutch 6 input speed and the clutch 6 output speed, the clutch 6 slip is determined. The clutch 6 input speed corresponds to the motor 2 speed, which is determined by means of the impulse transmitter 20; and the clutch 6 output speed is the same as the speed of the clutch 6 measured on the drive-side, ahead of the transmission 10, or also that measured with the impulse transmitter 22 behind the transmission 10, corrected by the translation ratio.

The overheating protection circuit 26 also has a computer apparatus 30, whose signal inputs are connected with the signal output of the slip determination apparatus 28 and the apparatus 18, and the energy in the form of friction determined according to the equation $M \cdot \omega_S$ from the clutch 6 slip value $\omega_S$ (difference between the clutch 6 input speed and the clutch 6 output speed, or the difference between the clutch 6 input angular velocity and the clutch 6 output angular velocity) and the motor 2 drive torque M consumed per unit of time.

The various friction values $M \cdot \omega_S$ are conducted to a monitoring apparatus 31, which has a memory 32 in which a table of various friction values ($M \cdot \omega_S$) are stored; thus for safety reasons, the maximum friction which occurs during an individual slip process can be selected. The friction value ($M \cdot \omega_S$) determined in this manner is always assigned at least one and in the presently preferred embodiment at least two alarm delay times $t_{1x}$, $t_{2x}$. The friction value determined in this manner is compared with the values in the table. After such comparison, the preferably at least two alarm delay times $t_{1x}$ and $t_{2x}$ are conducted to comparator apparatus 34 and are there compared with the current clutch 6 slip time $t_a$, which can be called up from a memory 36. Memory 36 increments the time during which clutch 6 slip is occurring and decrements the time from memory 36 during periods of time when no clutch 6 slip is occurring. In this manner, if all of the energy stored in the clutch 6 has not been dissipated before such clutch 6 begins to slip again, such current slip time can be adjusted accordingly. If the incremented current clutch 6 slip time $t_a$ exceeds the first alarm delay time $t_{1x}$, an alarm apparatus 38 is activated, which can alert the driver either acoustically or optically. If the current clutch 6 slip time $t_a$ also exceeds the second alarm delay time $t_{2x}$, a clutch 6 control apparatus 40 is activated, the output signal of which then slowly engages the clutch 6 by means of a line 42 and simultaneously exercises control over the transmitter 16 via a line 44, and thus reduces the clutch 6 slip.

The current clutch 6 slip times $t_a$ are derived from the time of the output signals of the slip determination apparatus 28, whereby the slip times destermined are added to the slip times stored in the memory 36. The slip times stored in the memory 36 are constantly reduced according to the specified function, which depends on the current cooling curve of the clutch 6 cooling time, continuously or in stages, up to a maximum of zero. This measure guarantees that clutch 6 slip processes which occur in sequence take into account only the remaining residual heat from the previous clutch 6 slip processes, so that overheating protection is ensured for each operating condition.

Although the presently preferred and various alternative embodiments of the invention have been described, it will be apparent to those persons skilled in the art that various other modifications and adaptations can be made without departing from the spirit and scope of the appended claims.

I claim:

1. An apparatus to determine friction values on a clutch and to detect an overload operating condition on such clutch disposed in an operating mechanism intermediate a motor and a drive train means, said apparatus comprising:
   (a) a means positioned on such mechanism for determining the rotational speed of such motor and for generating a first speed signal value representative of such motor rotational speed;
   (b) a means positioned on such mechanism for determining the speed of such drive train and for generating a second speed signal value representative of such drive train speed;
   (c) a slip determination means directly connected to receive said first speed signal value and said second speed signal value for determining an amount of slip in such clutch and for providing a clutch slip signal value $\omega_S$ representative of said amount of slip in such clutch;
   (d) a clutch transmitted torque determination means positioned on such operating mechanism for determining the amount of torque transmitted by such clutch and for generating a clutch transmitted torque signal value M representative of said amount of torque on such clutch;
   (e) a clutch friction value computing means connected to directly receive said clutch slip signal value $\omega_S$ and said clutch torque signal value M for computing a product of $\omega_S$ and M and for generating a product signal value representative of $\omega_S$ and M;
   (f) a memory storage means connected to receive said product signal value for assigning at least one allowable delay time and for generating an assigned delay time signal value;
   (g) a timing means connected to receive said clutch slip signal value for providing a signal value representative of current slip times, said timing means including a memory which stores slip times during periods of slip and provides a reduced current slip time during periods of no clutch slip in which said reduced current slip time during said period of no clutch slip corresponds to a cooling curve of such clutch; and
   (h) a comparator means connected to receive said signal value representative of said assigned delay time and said signal value representative of said current slip time for comparing said delay time with said current slip time, and providing an overload signal when said current slip time exceeds said delay time.

2. A detection apparatus, according to claim 1, wherein said overload signal initiates an alarm means.

3. A detection apparatus, according to claim 1, wherein said overload signal initiates a clutch closing thereby decreasing said clutch slip at a predetermined rate.

4. A detection apparatus, according to claim 1, wherein at least two overload signal values are assigned a lower value and an upper value and compared to said value of said current slip time signal and when said value of said current slip time signal exceeds said lower value overload signal initiates an alarm and when said value of said current slip time signal exceeds said upper value overload signal initiates a clutch closing at a predetermined rate.

5. A detection apparatus, according to claim 1, wherein said clutch transmitted torque determination means comprises a motor characteristic family of curves storage unit connected to receive said first speed signal value and an energy supply signal value representative of the amount of energy being supplied to such motor and a means for comparing said first speed signal value and said energy supply signal value with said stored motor characteristic family of curves.

6. A detection apparatus, according to claim 1, wherein said means for determining said rotational speed of such motor and generating said first speed signal value is an impulse transmitter.

7. A detection apparatus, according to claim 1, wherein said means for determining said speed of such drive train and generating a second speed signal is an impulse transmitter which includes a means for correcting said second speed signal by a translation ratio.

8. A detection apparatus, according to claim 1, wherein the rotational speed on the input side of such clutch is measured by a first impulse transmitter, and wherein a second impulse transmitter measures the rotational speed on the output side of such clutch, and said rotational speed signals are supplied to a differenceformation stage of said slip determination means which determines said clutch slip.

9. A detection apparatus, according to claim 1, wherein said apparatus further includes a means for determining said at least one allowable delay time from the equation:

$$t = \frac{E_1}{M \cdot (\omega_{Mot} - \omega_G)}$$

in which
   $E_1$ is a specified upper limit energy,
   M is the motor drive torque or moment of torsion,
   $\omega_{Mot}$ is the motor angular velocity, and
   $\omega_G$ is at least one of the drive-side angular velocity of such clutch and the drive-side angular velocity of such drive train corrected by the translation ratio of such drive train.

10. A detection apparatus, according to claim 1, wherein said at least one allowable delay time is determined by a process in which various values of the product $M \cdot (\omega Mot - \omega G)$ are compared to values stored in a table of a memory of said memory storage means at various times t.

11. A detection apparatus, according to claim 10, wherein said values determined from the product $M \cdot (\omega Mot - \omega G)$ are assigned decreasing allowable delay times t with increasing magnitude.

12. A detection apparatus, according to claim 10, wherein said values determined by the product $M \cdot (\omega Mot - \omega G)$ are always assigned two different sequential alarm delay times $t_1$ and $t_2$.

13. A detection apparatus, according to claim 1, wherein said timing means further comprises a means for storing said slip times which have been determined in a memory, and adds these slip times to the slip times which were determined during previously monitored clutch slip processes.

14. A detection apparatus, according to claim 13, wherein said slip time stored in said memory is reduced by a specified function according to the current curve of such clutch cooling time.

15. A detection apparatus, according to claim 13, wherein said existing current slip time $t_a$ stored in said memory is compared with said at least one allowable delay time $t_{1x}$ corresponding to the current friction value $M \cdot (\omega Mot - \omega G)$ determined in said memory storage means in a time comparator.

16. A detection apparatus, according to claim 1, wherein said apparatus further comprises at least one microprocessor for the execution of the operations and calculations.

17. A method of determining a clutch friction value and of detecting an overload operating condition on such clutch disposed on an operating mechanism intermediate a motor and a drive train, said method comprising the steps of:
  (a) generating a first speed signal having a value representative of a rotational speed of said motor;
  (b) generating a second speed signal having a value representative of a speed of said drive train;
  (c) comparing said value of said first speed signal generated in step (a) with said value of said second speed signal generated in step (b) to determine a presence of current slip in said clutch;
  (d) generating a clutch slip signal $\omega_S$ when current slip is present in said clutch;
  (e) generating a clutch transmitted torque signal M having a value representative of an amount of torque transmitted by said clutch;
  (f) computing an arithmetic product of said value of said clutch slip signal $\omega_S$ generated in step (d) and said value of said clutch transmitted torque signal M generated in step (e);
  (g) generating a signal having a value of said product computed in step (f), said product having a value representative of said clutch friction value;
  (h) generating at least one allowable delay time as a function of said signal generated in step (g);
  (i) generating a signal representative of a duration of current clutch slip times from said signal generated in step (d);
  (j) comparing said value of said at least one allowable delay time signal generated in step (h) with said value of said current clutch slip time signal;
  (k) storing slip times during periods of slip and reducing current slip times during periods of no clutch slip in which said reduced current slip time during said period of no clutch slip corresponds to a cooling curve of such clutch; and
  (l) providing an overload signal when said value of said current slip time signal exceeds said value of said at least one allowable delay time signal.

18. A method of detecting an overload on a clutch, according to claim 19, wherein said method includes the additional steps of:
  (1) storing the accumulated current slip times during periods of clutch slip, and
  (2) reducing said accumulated current slip times during periods of no clutch slip.

19. A method of detecting an overload on a clutch, according to claim 17, wherein said method includes the additional step of:
  initiating an alarm from said overload signal generated in step (i).

20. A method of detecting an overload on a clutch, according to claim 17, wherein said method includes the additional step of:
  initiating a clutch closing at a predetermined rate.

21. A method of detecting an overload on a clutch, according to claim 17, wherein:
  (1) said method includes the additional steps of generating at least two overload signals in step (i),
  (2) assigning a lower value and an upper value to said at least two overload signals,
  (3) comparing said value of said current slip time signal with said values of said at least two overload signals,
  (4) initiating an alarm when said value of said current slip time signal exceeds said lower value of said overload signal, and
  (5) initiating a clutch closing when said value of said current slip time signal exceeds said upper value of said overload signal at a predetermined rate.

22. A method of detecting an overload on a clutch, according to claim 17, wherein said method includes:
  determining said at least one allowable delay time according to the equation:

$$t = \frac{E_1}{M \cdot (\omega Mot - \omega G)}$$

in which
  $E_1$ = a specified upper energy limit,
  M = the motor drive torque,
  $\omega Mot$ = the motor angular velocity, and
  $\omega G$ = at least one of the drive-side angular velocity of said clutch and the drive-side angular velocity of said drive train corrected by a translation ratio of said drive train.

* * * * *